United States Patent [19]

Schubert

[11] 4,221,135

[45] Sep. 9, 1980

[54] POSTAGE METER CONVERSION APPARATUS

[75] Inventor: Keith E. Schubert, Rowayton, Conn.

[73] Assignee: Pitney Bowes Inc., Stamford, Conn.

[21] Appl. No.: 914,404

[22] Filed: Jun. 12, 1978

Related U.S. Application Data

[63] Continuation-in-part of Ser. No. 726,638, Sep. 27, 1976, abandoned.

[51] Int. Cl.$^2$ .......... F16H 19/04

[52] U.S. Cl. .......... 74/29; 74/89.14; 74/425; 74/458

[58] Field of Search .......... 74/89.14, 63, 70, 76, 74/29, 30, 425, 425.5, 458, 383, 437; 235/101, 91

[56] References Cited

U.S. PATENT DOCUMENTS

| | | | |
|---|---|---|---|
| 1,746,722 | 2/1930 | Trbojevich | 74/458 |
| 2,498,754 | 2/1950 | Fowler | 235/101 X |
| 3,590,653 | 7/1971 | Dreckman | 74/425 |
| 3,664,578 | 5/1972 | Noller | 235/101 |
| 4,090,063 | 5/1978 | Martin | 235/101 X |

*Primary Examiner*—James T. McCall

*Attorney, Agent, or Firm*—Peter Vrahotes; William D. Soltow, Jr.; Albert W. Scribner

[57] ABSTRACT

A postage meter attachment or conversion apparatus is disclosed that will effectively convert a manually lever settable postage meter into an electrically controlled postage meter. The conversion apparatus is easily assembled to and disassembled from a standard lever settable postage meter. Each lever of the meter is settable simultaneously. The motion of the drive mechanism of the conversion apparatus conforms to the arcuate motion of the meter setting levers, thus eliminating the need for precise alignment between the levers and the drive mechanism. The conversion apparatus can be used to make the mechanical meter compatible in an electrical environment containing equipment such as a computer, a digital scale, and other postage system processing devices.

4 Claims, 2 Drawing Figures

FIG.1.
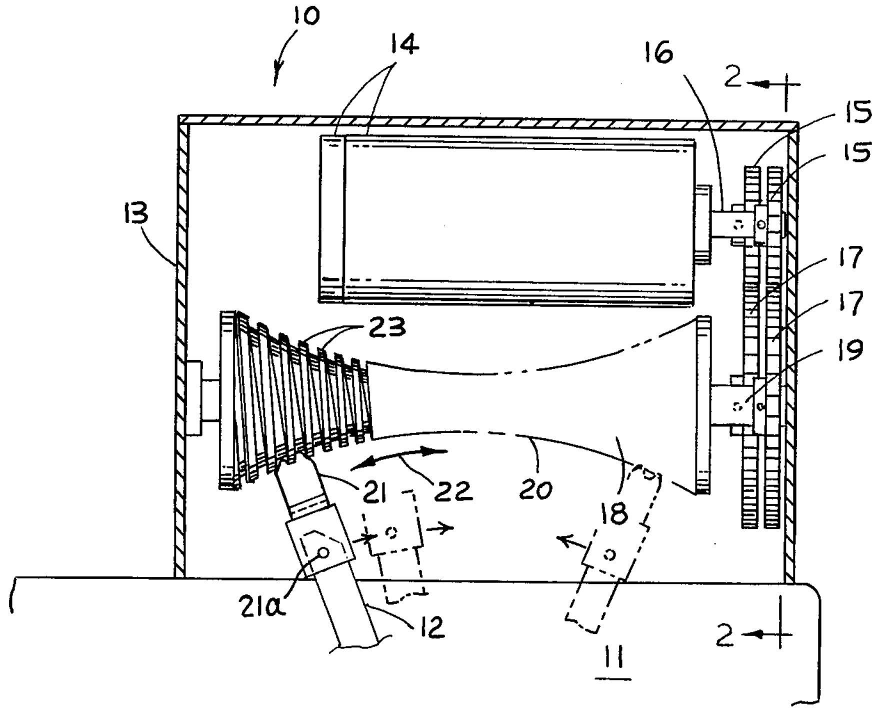
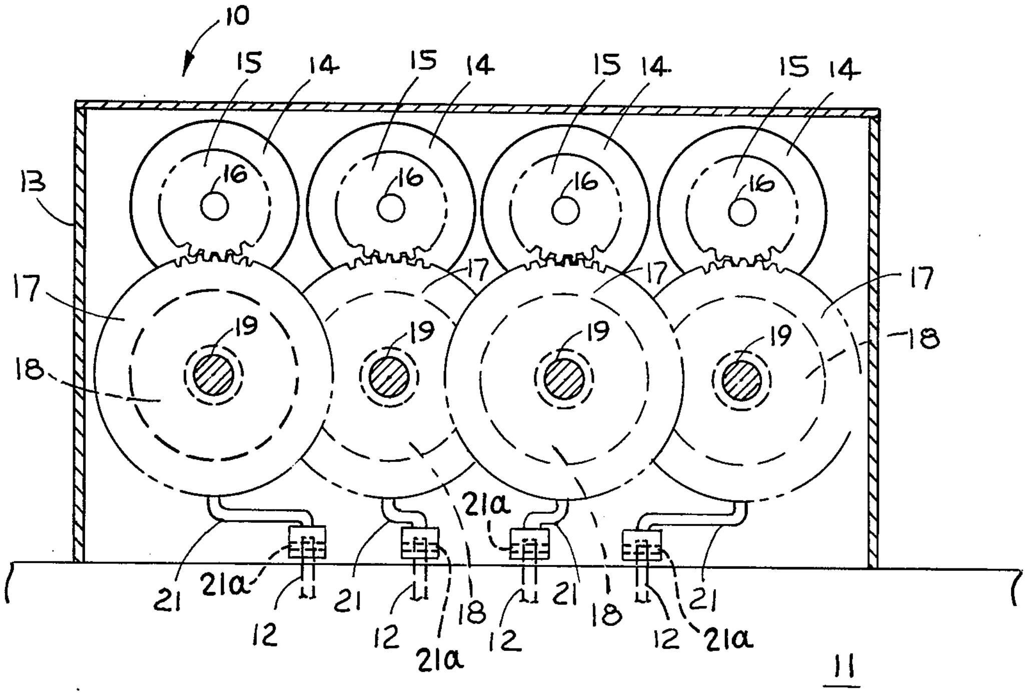
FIG.2.

POSTAGE METER CONVERSION APPARATUS

CROSS REFERENCE TO RELATED APPLICATION

This application is a continuation in part of prior application, Ser. No. 726,638, filed Sept. 27, 1976, and now abandoned.

BACKGROUND OF THE INVENTION

This invention pertains to postal equipment, and more particularly to a conversion or attachment unit for making a standard manually settable postage meter compatible in an electrical environment.

With more and more processing equipment becoming electrically controlled, a need is emerging for converting mechanical postal systems and equipment to electrical control.

Because present federal law prevents the direct modification or redesign of a postage meter, the invention concerns itself with the logical alternative, viz., a conversion attachment.

While conversion attachments are not new per se, the present invention features a novel mechanism packaged as a unit which provides ease of adaptability, assembly, reliability and low cost of manufacture.

A postage meter conversion unit not unlike the present invention is illustrated in patent application Ser. No. 705,477; filed July 15, 1976. This prior apparatus set each lever of the postage meter in a simultaneous manner, but because of the mismatch in the drive and lever motions, it required precise alignment of the drive and levers. The present inventive unit provides a drive unit which can accommodate the arcuate motion of the setting levers of the associated postage meter.

SUMMARY OF THE INVENTION

The invention relates to a postage meter conversion or attachment apparatus for converting a manually lever settable postage meter to an electrically controlled postage meter.

The inventive conversion unit comprises a drive motor for each meter order or bank. A number of hourglass worms are each rotatively driven by a respective motor. As each worm is rotated, a respective follower member is caused to move arcuately across the worm. A lever of each postage meter bank is respectively connected to a follower member such that, as the follower member is caused to move, the lever is set to a desired postage value. The motion of the follower members are each compatible with the arcuate motion of the meter levers.

The motors are generally operated simultaneously to provide a quick setting of postage. Appropriate electronics may be designed into the system such that each bank need not be zeroed. In other words, each bank may be set directly from a previous position or setting.

Because the motion of the follower members conform to the arcuate motion of the meter levers, the levers and the followers can be directly fastened. Also, the conversion apparatus may be made vertically more compact as a result.

The hourglass worms may be constructed to have a variable threaded pitch, so that only one revolution of the worms will be required for moving the levers to successive postage value positions.

The conversion unit is easily assembled to the postage meter and its surrounding housing. The conversion apparatus allows the mechanical meter to be electrically controlled by a computer or a digital scale, etc.

It is an object of this invention to provide an improved conversion apparatus for operating a manually settable postage meter by electrical control;

It is another object of the invention to provide a conversion unit for a postage meter which is easy to assemble;

It is a further object of this invention to provide a reliable low cost conversion unit for electrically controlling a standard mechanical postage meter.

These and other objects of the invention will become more apparent and will be better understood with reference to the following detailed description taken in conjunction with the attached drawings, in which:

FIG. 1 is a side view of the conversion apparatus of the invention; and

FIG. 2 is a front view of the inventive conversion apparatus shown in FIG. 1.

DETAILED DESCRIPTION

Now referring to FIGS. 1 and 2, the conversion unit 10 of this invention is shown in mounted relationship to a postage meter 11 having a number of arcuately movable setting levers 12. The postage meter 11 is generally one of a type in a series designated as the 5300 Model Series manufactured and leased by the present assignee of this invention, Pitney-Bowes, Inc., Stamford, Connecticut.

The conversion unit 10 comprises a housing 13, in which a number (in this case 4) of high speed gear motors 14 are mounted by any suitable means (not shown). A drive gear 15 is affixed to each gear motor shaft 16. The drive gears 15 engage with, and rotatively drive gears 17, respectively, suitably mounted on a shaft in housing 13. Hourglass worms 18 are keyed to shafts 19, which in turn, are keyed to grears 17. Thus, it will be seen, that each gear motor 14 will rotatively drive a respective hourglass worm 18 via transmission gears 15 and 17, respectively.

The threaded profile 20 ( circular arc) of the hourglass worms 18, are each designed to provide an arcuate path of travel (arrows 22) for a follower arm 21, respectively. The follower arms 21 are each secured to a respective lever 12 by means of a pin *21a*. The ends of the followers 21 are grooved to mesh with worm 18. The profile 20 has an arc which is designed to match the arcuate path of travel of the levers 12, such that the connection between the arms 21 and the levers 12 can be easily accomplished by a fixed fastener element *21a*. This is so, because the matching motions do not produce a vertical displacement between them. Also, this eliminates the need for precise alignments which are usually required when the drives have linear motion which produce vertical displacements.

The pitch of the threads 23 of the hourglass worms 18 can be made variable, such that the worms 18 will move the levers 12 to each successive postage value position for each single revolution of the worm. As is well known, the setting levers 12 of postage meters, such as the Pitney Bowes model 5300 series, supra, do not move a uniform increment when moved across the arcuate path to change the postage amount. For example, the incremental movement to change a postage digit from a "0" to a "1" may be 0.3021", from "1" to "2" 0.3203", from "2" to "3" 0.3343", from "3" to "4" 0.3435", and from "4" to "5" 0.3483". Thereafter the cycle would repeat itself in reverse order, "5" to "6" 0.3483", "6" to "7" 0.3435" etc. In order to have a precise alignment, and thereby prevent wear on the detent mechanism of the postage meter, the threads 23 can be made variable to accomodate the variable increments of the postage meter setting levers 12. This has the advantage of providing an easy way to monitor the position of the respective levers 12, by counting the revolutions of the worms 18 or the motor shafts 16.

As can be seen from FIGS. 1 and 2, the conversion unit 10 can be made very small and compact. Also, the conversion unit 10 is easily secured to the postage meter 11 by any suitable means. The motors 14 can be electrically actuated and controlled by a computer, computerized equipment, a scale having an electrical output, etc. Thus, it is seen, that the objects of the invention have been met by the above-described unit.

Having thus described the invention, what is desired to be protected by Letters Patent is embodied within the appended claims.

What is claimed is:

1. The combination of a postage meter and a conversion apparatus for converting a lever settable mechanical postage meter into an electrically controlled postage meter, comprising:

a postage meter having a number of setting levers, each of which is movable along an arcuate path in an incremental position to position variation to set the postage meter to a selected value;

a driving motor for each postage meter lever;

a rotatably hourglass worm for each postage meter lever, each hourglass worm being operatively connected to, and rotatively driven by, a respective driving motor, each of said hourglass worms having an arcuate profile along a threaded periphery thereof, which conforms with the arcuate path of a corresponding lever;

a follower member for each hourglass worm, each follower member engaging with, and being driven by its respective hourglass worm, each follower member being connected to a lever, whereby as each motor drives its respective hourglass worm, a corresponding follower member causes an associated lever of a respective postage meter bank to be set to a desired postage value; and each of said hourglass worms having a variable threaded pitch to accommodate the position to position incremental variation when said lever is moved from one setting to another whereby the position of its respective lever may be monitored.

2. The combination of claim 1, wherein each lever has a plurality of consecutive postage value settings disposed along said arcuate path corresponding to one rotation of said hourglass worm for each successive setting.

3. The combination of a postage meter with a conversion apparatus for converting a lever settable mechanicam postage meter into an electrically controlled postage meter, comprising:

a postage meter having at least one setting lever movable along an arcuate path to set a postage value for said postage meter;

at least one driving motor;

at least one rotatable hourglass worm operatively connected to, and rotatively driven by, one of said driving motors, each of said hourglass worms having an arcuate profile along a threaded periphery thereof, which conforms with the arcuate path of a corresponding lever;

a follower member for each of said hourglass worms, said follower member engaging with, and being driven by its respective hourglass worm, said following member being connected to a lever, whereby as a motor drives its respective hourglass worm, the respective following member causes its corresponding lever to be set to a desired postage value; and each of said hourglass worms accommodates the position to position increment variation when said lever is moved from one setting to another whereby the position of its respective lever may be monitored.

4. The combination of claim 3, wherein each lever has a plurality of consecutive postage value settings disposed along said arcuate path corresponding to one rotation of said hourglass worm for each successive setting.

* * * * *